Jan. 17, 1956  C. F. FRATUS  2,731,619

BRAKE LINING SIGNAL

Filed Sept. 27, 1954

Clarence F. Fratus
INVENTOR.

BY *Clarence A. O'Brien*
*and Harvey B. Jacobson*
Attorneys

United States Patent Office 2,731,619
Patented Jan. 17, 1956

2,731,619
BRAKE LINING SIGNAL

Clarence F. Fratus, Providence, R. I.

Application September 27, 1954, Serial No. 458,635

4 Claims. (Cl. 340—52)

This invention relates generally to signalling mechanisms and systems and pertains more particularly to a mechanism adapted to be associated with the vehicle brake shoe for the purpose of apprising the vehicle operator when wear on the brake lining has reached a dangerous point.

It is a not uncommon occurrence in connection with vehicles to have the brake linings thereof wear to such a point that the rivets holding the linings to the brake shoes or the brake shoes themselves engage the brake drums and cause scarring and scuffing thereof. This, of course, necessitates costly repairs to the brake drum as well as replacement of the brake shoe and lining assemblies. The tendency toward such occurrences has been increased in recent years by the use of such mechanisms as over-drives or torque converters in vehicle drives which tends, due to the fact that such devices do not permit the vehicle engine to act as a braking unit, to throw a greater load on the vehicle brakes and cause more rapid wear thereof. Since the inspection of a vehicle's brakes is often neglected, and is at best a troublesome operation, it is common for scarring and damaging of brake drums to occur.

It is therefore a primary object of this invention to provide a warning device to obviate undue wear conditions on a vehicle brake lining.

Another object of this invention is to provide a combined warning and ignition cut-out assembly for use in conjunction with vehicle brake shoes and linings which will substantially obviate damage to brake drums.

Still another object of this invention is to provide an improved switch or contact mechanism for use in conjunction with vehicle brake shoe assemblies wherein a pair of contact members which are adapted to be progressively and successively contacted to first apprise the vehicle operator when the wear of the brake lining has progressed to a dangerous point and at a predetermined point thereafter to render inoperable the ignition system of the vehicle when the brakes are applied, thus substantially assuring that undue wear and consequent damage to brake drums will be obviated.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
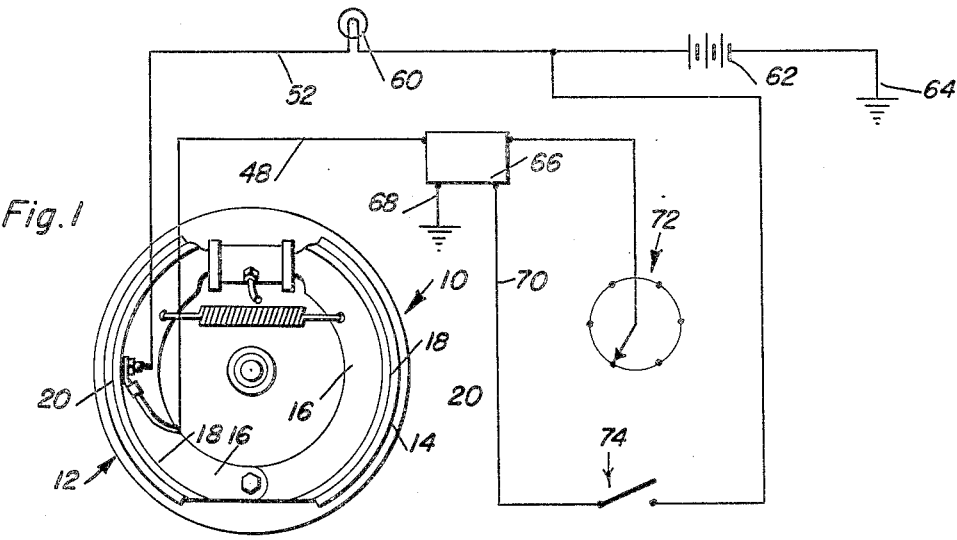
Figure 1 is a diagrammatic view showing the system in operation.

Referring now more particularly to the drawings, the numerals 10 and 12 indicate conventional brake shoe assemblies mounted upon a backing plate member 14 and each of which comprises a brake shoe member generally of T-shaped configuration in cross section and including a web portion 16 and a transverse flange 18, the latter of which serves as a support to which the brake lining material 20 is rigidly secured either by riveting or by binding.

Figure 2:
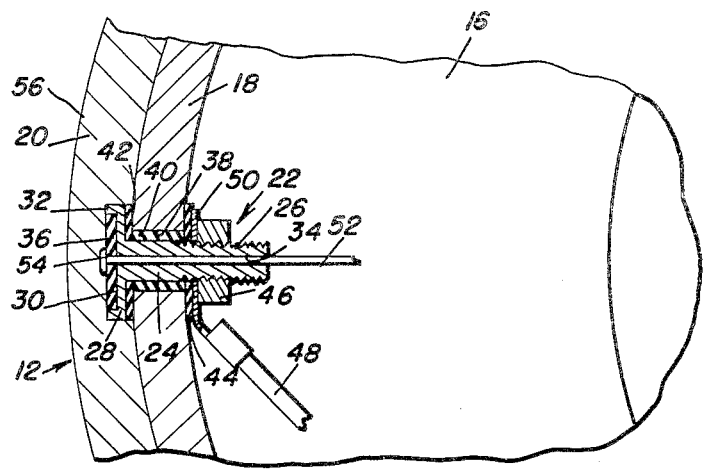
Figure 2 is an enlarged sectional view taken through a brake shoe assembly and showing the contact assembly associated therewith.

As will be seen most clearly in Figure 2, the contact assembly or switch mechanism which is indicated generally by the reference character 22 consists essentially of a main body member 24 having an elongated threaded stem or shank 26 and also having an enlarged head portion 28 provided with a recess 30 in its end face 32. A longitudinal bore 34 is provided through the member 24 such as to intersect the recess 30 and to register with the center opening of an annular insulating washer member 36 placed within the recess.

In insulation of this assembly on the brake shoe, a hole 38 is bored through the flange 18 thereof and an insulating sleeve member 40 is inserted within this hole in the manner shown. The member 24 is inserted through the bushing or sleeve 40 with an insulating washer 42 under the head portion 28 and a further insulating washer 44 together with the securing nut 46 engaged on the threaded end 26 completes the securement of the assembly to the brake shoe. This operation, it will of course be understood, is performed before the brake lining 20 is secured to the brake shoe.

The washer 44 also serves not only to insulate the member 24 from the metallic material of the brake shoe, but also to insulate the conductor 48 therefrom which, as will be clearly seen, is provided with a clip end 50 interposed between the securing nut 46 and the washer 44.

An insulated conductor member 52 is projected through the bore 34 of the member 24 and is provided with a contact member 54 at its free end in overlying relation to the washer 36 in the manner shown.

The brake lining 20 is of course properly recessed to receive the projecting end of the contact assembly so that the lining may be flushly engaged with the flange 18 of the brake shoe and secured rigidly thereto by suitable means.

At this point, it will be noted that both contact faces 54 and 32 are disposed a substantial distance below the normal wear surface 56 of the brake lining 20 and at such a point beyond which it is not desirable to have brake lining wear take place. During normal wear, the lining 20 will become progressively thinner until the associated brake drum, not shown, will be contacted by the contact member 54 when the brakes are applied. This, as will be hereinafter set forth, operates a visual or audible warning signal to the vehicle operator. After the brake lining has worn a little more, the contact provided by the end face 32 of the enlarged head 28 will be engaged against the brake drum during application of the brakes and this contact will effect a cut-off or cut-out of the vehicle ignition system, as hereinafter set forth. It is to be understood that both the contact 54 and the enlarged head 28 are preferably formed of relatively soft material such as to prevent scarring or undue damage to the brake drum and in this respect, it is to be understood that the contact 54 is really a blob of solder secured directly to the end of the conductor 52.

Referring now more particularly to Figure 1, it will be seen that the conductor 52 extends to a point of connection with a signal lamp 60 or any other suitable warning signal device and thence to the conventional vehicle battery 62 which is grounded as at 64. The conductor 48, on the other hand, extends to a suitable relay switch mechanism 66, grounded at 68, which is interposed in the primary ignition circuit 70. The primary circuit will be understood to contain an ignition coil, not shown, serially interposed in the circuit 70 for connection to the distributor mechanism 72, the conventional ignition switch being indicated by the reference character 74.

Thus, it will be readily apparent that when the contact member 54 is engaged, the signal lamp 60 will be lit whereas after further brake lining wear, the end face 32 of the contact assembly will be engaged such as to energize the relay switch 66 and open the circuit 70 which is the primary circuit of the ignition system. This latter action will cause a stall of the automobile and will forcibly apprise the vehicle operator that his brakes must be attended to.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. In a warning system to prevent undue wear on vehicle brakes, a brake shoe, a brake lining secured to said shoe, a contact assembly disposed below the normal wear surface of said lining, said assembly including a pair of contacts, one of said contacts being disposed further below the normal wear suface of the lining than the other contact, said one contact being connected to a warning device and the other contact being associated with the vehicle ignition system whereby when wear on the lining progresses to a point wherein the one contact is engaged, during brake application, against an associated brake drum a warning device will be energized and whereby continued wear will cause engagement of the other contact with an associated brake drum to interrupt the vehicle ignition operation.

2. A switch mechanism for use in a device for preventing undue wear on vehicle brakes comprising, a first contact member having an elongated, threaded stem for securing the member to a brake shoe and an enlarged head at one end, said first member having a longitudinal bore therethrough and a recess in communication therewith and intersecting the bore, an insulating washer received in said recess and flush with the face of said head, a conductor extending through said bore and said washer, and a second contact connected to said conductor and overlying said washer.

3. A switch mechanism for use in a device for preventing undue wear on vehicle brakes comprising, a first contact member having an elongated threaded portion for securement to a brake shoe and an enlarged head portion at one end, said head portion having a recess in its end face and said elongated portion having a longitudinal bore therethrough intersecting said recess, an insulating washer received in said recess, a conductor projecting through said bore and said washer, a second contact secure to said conductor and projecting beyond the end face of said enlarged head.

4. A brake wear indicating mechanism comprising, a head adapted to be disposed below the normal wear surface of a brake lining, said head having an end face presenting a contact surface and provided with a recess, an insulating washer disposed in said recess, a second contact overlying said washer and projecting beyond the said face of the first contact, and means for securing said mechanism to an associated brake shoe.

References Cited in the file of this patent

UNITED STATES PATENTS

| 2,494,269 | Sparkes | Jan. 10, 1950 |
| 2,636,090 | Branschofsky | Apr. 21, 1953 |

FOREIGN PATENTS

| 88,470 | Austria | May 26, 1922 |